United States Patent [19]

Nowell

[11] Patent Number: 4,900,215
[45] Date of Patent: Feb. 13, 1990

[54] POWERED TOWING DOLLY FOR VEHICLES

[76] Inventor: Charles P. Nowell, 1302 Adams St., Salinas, Calif. 93906

[21] Appl. No.: 268,787

[22] Filed: Nov. 9, 1988

[51] Int. Cl.⁴ .............................................. B60B 29/00
[52] U.S. Cl. .................................. 414/428; 414/458; 414/476; 414/485; 280/79.4; 254/8 R
[58] Field of Search .............. 414/426, 428, 458, 474, 414/476, 482, 484, 485, 911; 254/8 R; 280/402, 414.5, 43.14, 43.15, 43.16, 79.4

[56] References Cited

U.S. PATENT DOCUMENTS

| | | | |
|---|---|---|---|
| 1,169,255 | 1/1916 | Graham | 280/43.16 |
| 1,564,713 | 12/1925 | Reiter | 280/43.16 |
| 2,170,607 | 8/1939 | Green | 414/428 |
| 2,386,516 | 9/1945 | Thompson | 414/428 X |
| 2,476,493 | 7/1949 | Johnson | 254/8 R |
| 2,538,473 | 1/1951 | Russell et al. | 414/426 |
| 2,554,365 | 5/1951 | Johnston, Jr. et al. | 254/8 R |
| 3,080,196 | 3/1963 | Darby | 280/43.14 |
| 3,583,723 | 6/1971 | Nowell | 280/79.4 |
| 4,240,773 | 12/1980 | Terry | 414/911 X |
| 4,690,605 | 9/1987 | Coccaro | 414/426 X |
| 4,696,484 | 9/1987 | Casey | 280/79.4 X |

FOREIGN PATENT DOCUMENTS 2599316 12/1987 France ........................ 280/402

Primary Examiner—Robert J. Spar
Assistant Examiner—John V. VandenBosche
Attorney, Agent, or Firm—Linval B. Castle

[57] ABSTRACT

A dolly for lifting one end of a vehicle and for towing the vehicle includes a pair of identical tandem wheel assemblies interconnected by a pair of spaced parallel steel tubes. At least one of the wheel assemblies includes a hydraulic piston which, in spreading one pair of arms on crank members coupled to the wheel assemblies, forces together the second pair of arms. The ends of the spaced parallel steel tubes are coupled into sockets on the ends of the second pair of arms so that their forcing together operates to lift a vehicle whose tires are resting across the steel tubes. The invention includes means for locking the tubes in their raised position and further includes vehicle wheel locking plates that are actuated by the lifting process.

8 Claims, 3 Drawing Sheets

POWERED TOWING DOLLY FOR VEHICLES

BRIEF SUMMARY OF THE INVENTION

This invention relates to towing equipment and in particular to a wheeled towing dolly having a pair of parallel carrier members which, when placed on the ground on each side of a vehicle tire, can be powered to lift the tires for transporting the vehicle.

Vehicle towing dollies are extensively used by tow truck operators for transporting a disabled vehicle to a repair facility. When one end of the disabled vehicle is mounted on the dolly and the tow truck lifts the other, the entire vehicle may be lifted from the ground to be towed without the need to disconnect drive shaft linkage. Such a dolly may also be used, for example, to tow a "spare" car behind a motor home. In such cases, the drive shaft axle is lifted so that its tires are supported on a towing dolly and the car is then towed from the opposite end.

An important advantage of the towing dolly to be described is that it is portable and may be assembled when required. In its unassembled form, the dolly comprises two steel tubes two inches in diameter and about 75 inches in length, and two wheel assemblies each supporting two small wheels mounted on a tandem frame. At least one of the wheel frames supports a jack or a hydraulic piston actuatable from the tow truck hydraulic system to draw together the parallel steel tubes that will interconnect the two wheel assemblies, the drawing together operating to lift the vehicle wheels about six inch off the ground. A conventional tow truck may therefore conveniently carry the dolly disassembled and assemble it around a disabled vehicle, without moving the vehicle, in a very few minutes.

BRIEF DESCRIPTION OF THE DRAWINGS

In the drawings which illustrate the preferred embodiment of the invention.

DETAILED DESCRIPTION OF THE PREFERRED EMBODIMENT

Figure 1:
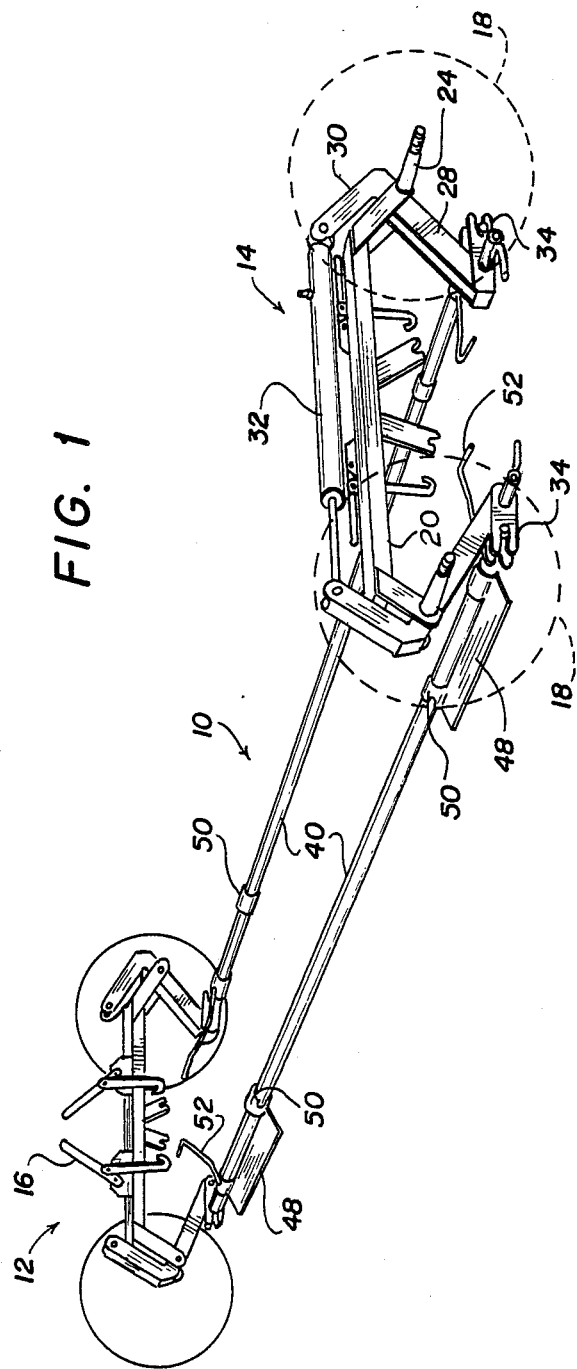
FIG. 1 is a perspective view illustrating the towing dolly with the dolly tires shown by dotted lines.

FIG. 1 is a perspective drawing of the towing dolly 10 with its wheels illustrated as circles or dotted lines mounted on axles on tandem frames 12, 14. The frames are substantially similar, except that one frame 14 is hydraulically powered while the distal frame 12 is provided with an over-center locking mechanism 16. If desired, both frames 12, 14 may be powered by a hydraulic ram or by a manually operable jack and both may be provided with locking mechanisms 16.

Figure 2:
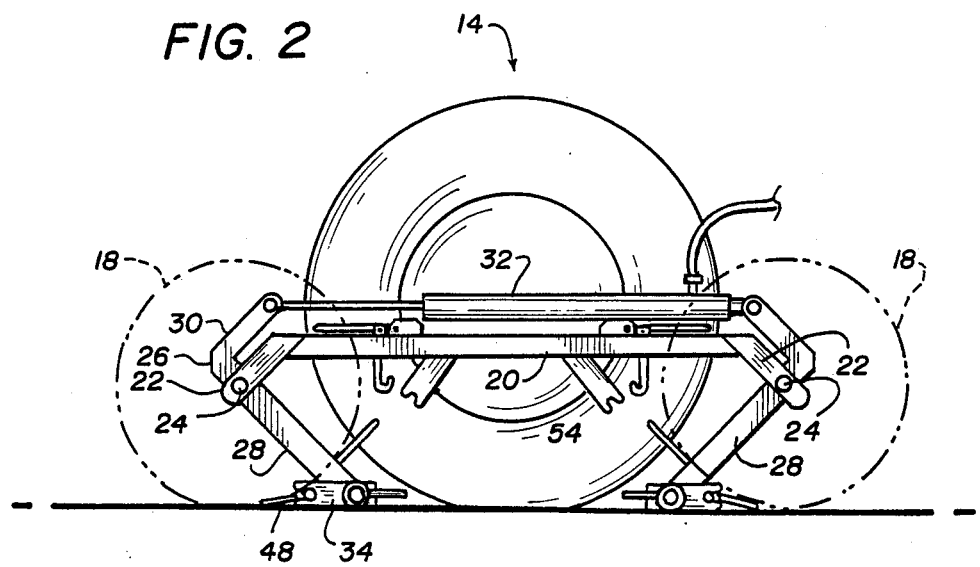
FIG. 2 is an elevational view showing the parts arrangement of the first end of the dolly.

FIG. 2 is an elevational view illustrating the frame 14 in detail. Interconnecting the two tandem wheels 18 on the frame 14 is a horizontal base bar 20, that is preferably formed of two inch square steel tubing about thirty inches in length. At each end of the bar 20 are end members 22 that are angled out and down at an angle of about 45° and one inch diameter holes are drilled near the lower ends of the end members 22 to receive axles 24 for eighteen inch dolly wheels 18. The total spacing between the axles is about thirty six inches.

Each of the axles 24 in the two end members 22 also pivotally support a crank arm 26 preferably formed of two inch square steel tubing and having a lower main arm 28 about one foot in length and an upper arm 30, at right angles to the main arm, about eight inches in length. A one inch hole is drilled through the main arm 28 near its junction with the upper arm 30 so that the crank arm 26 may be pivotally coupled by the axle 24 to the end members 22. Similarly, a hole is drilled through the upper arm 30 near its end opposite its junction with the main arm 28 for a pivotal connection to one end of a hydraulic piston assembly 32. While the preferred embodiment includes a hydraulic piston, a manually operated ratchet jack or jack screw will operate satisfactorily.

Figure 5:
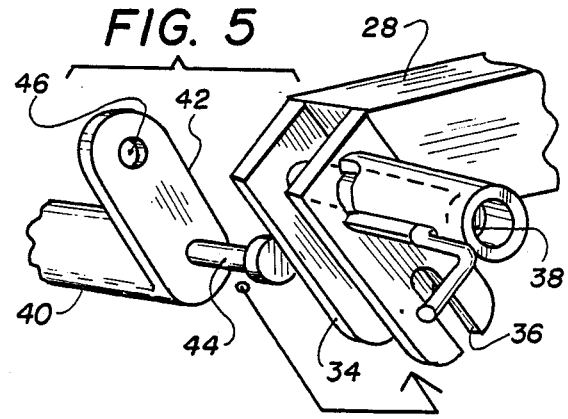
FIGS. 5 and 6 illustrate the quick connections between the ends of the steel tube carrier members and the tandem wheel assemblies.
Figure 6:
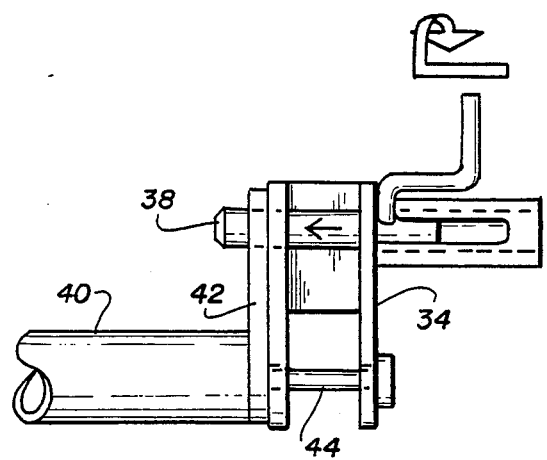

The end of each main arm 28 opposite the upper arm 30 is equipped with a socket assembly 34 as shown in FIGS. 1, 2 and in greater details in FIGS. 5 and 6. As shown in FIG. 5, each assembly includes a pair of spaced parallel bars with their edges welded at an approximate 45° angle to the end of a main arm 28. The bars are about six inches in length and both have short longitudinal slots 36 at the free ends and a laterally positioned deadbolt 38 which slides in a tubular housing welded to the exterior surface of one of the bars to pass its bolt through about a one-inch clearance hole through both bars.

The socket assemblies 34 on the ends of each main arm 28 provide a means for rapidly coupling the tubular steel cross member vehicle carriers to the tandem wheel assemblies 12, 14.

As shown in FIG. 1, the two tandem wheel assemblies 12, 14 are interconnected by two tubular steel members 40 which, when placed on the ground on either side of the tires on one vehicle axle, secure together the wheel assemblies and function to lift the vehicle. Welded to each end of each tubular member 40 is a lateral plate 42, shown in FIGS. 5 and 6, from which extends a wide-headed stud 44 coaxial with the steel member and, spaced therefrom, a hole 46 for entry of the pin of the deadbolt 38. To secure the end of a tubular steel member 40 to a wheel assembly, it is only necessary to slide the wide headed stud 44 into the slot 36 and rotate the steel member until the deadbolt pin 38 can enter the hole 46 in the plate 42. The bolt is then rotated a quarter turn to lock it against accidental removal and to place the deadbolt actuating handle into a nearly vertical position in a slot in the tubular housing.

FIG. 1 illustrates the tubular steel members 40 secured to the socket assemblies in the wheel assemblies 12, 14. Rotatably coupled to each member 40 at locations near the ends thereof are vehicle wheel locking plates 48 secured to sleeves 50 around the tubular members. Also attached to each sleeve 50 is a positioning rod 52 which extends upward to terminate in an "L" shaped bend. As best shown in FIG. 1, a small arcuate sector is cut in each sleeve 50 and small pins in the tubular members 40 prevent longitudinal movement of the sleeve along the members and also limit the rotation of the sleeves around the members. Thus, while the tubular members are positioned on the ground, the plates 48 also contact the ground and are slanted downward into a ramp position while the upper bent ends of the positioning rods 52 are aligned to engage an end slot in a stop plate 54 when the tubular members are raised. When thus raised the stop plates engaging the positioning rods rotate the sleeves 50 and their attached wheel locking plates 48 so that the plates 48 are tilted up around a vehicle tire to lock the tire as best shown in FIG. 4.

Figure 4:
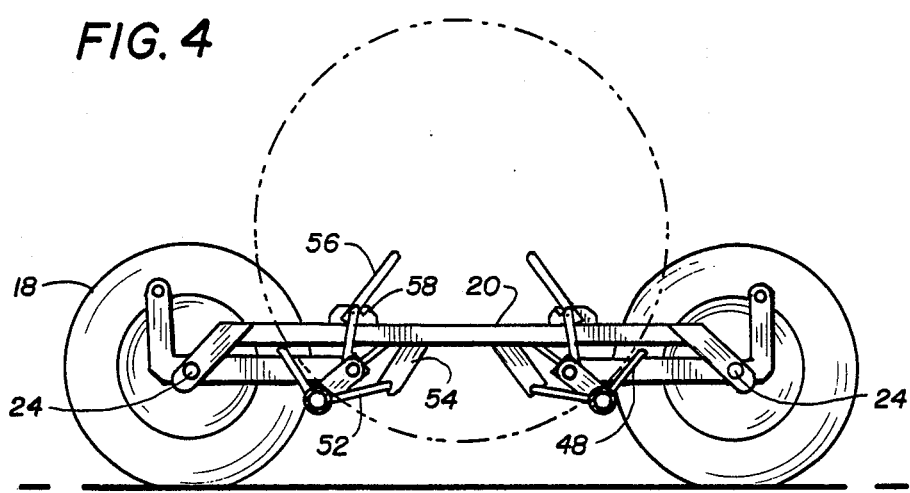
FIG. 4 is an elevational view of the second end of the dolly.

FIG. 4 illustrates the detail of the wheel assembly 12, which is without the hydraulic piston and is shown with an over-center locking assembly. Again it must be emphasized that both wheel assemblies are substantially identical and both may be provided with power such as the hydraulic ram or manual jack as well as the over-center locking mechanism.

Figure 7:
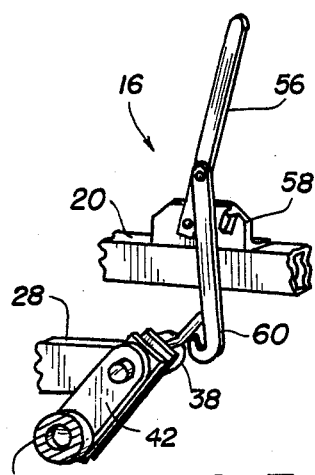
FIG. 7 illustrates the over-center lock assembly for securing the second end of the dolly.

The over-center locking mechanism 16 illustrated in FIG. 1 is shown in detail in FIG. 7 and includes a flat handle bar 56 about fourteen inches in length with one hole at its lower end and a second hole spaced about two inches therefrom along the bar axis. The lower end hole is loosely riveted to an angled plate 58 secured to the top surface of the base bar 20 and the second hole is bolted or loosely riveted to the end of a hook element 60 that is positioned to engage the tubular shield on the deadbolt 38. It is to be noted that the engagement of the hook element 60 around the tubular shield of the deadbolt 38 secures the deadbolt actuating handle in its locked vertical position making it impossible to release until after removal of the hook element.

Figure 3:
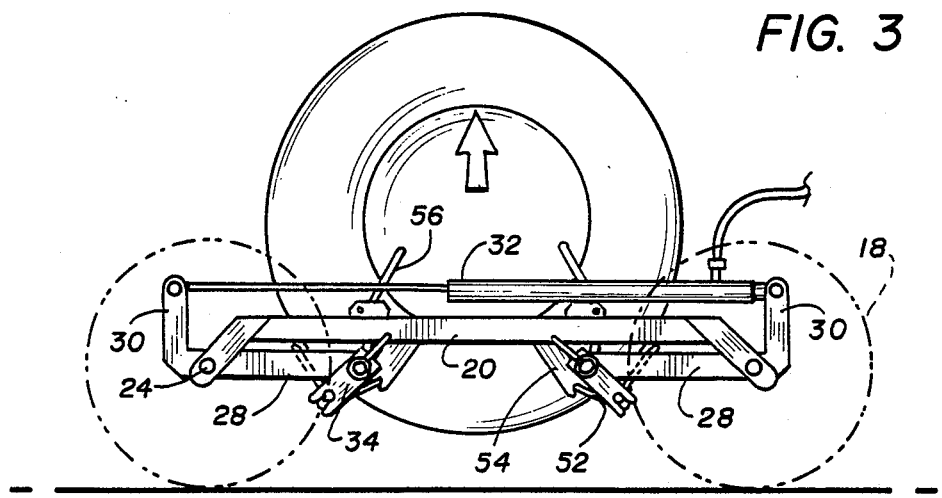
FIG. 3 is an elevational view illustrating the first end of the dolly in its vehicle elevating position.

Operation: The operation of the towing dolly is best understood from an examination of FIGS. 2 and 3. The separate components of the dolly, namely the two tubular members 40 and the two tandem wheel assemblies 12, 14, are easily transported in a tow truck or small pickup truck. The components are assembled as described above by coupling the ends of the tubular members 40 to the socket assemblies 34 at the lower ends of the crank arms 26 which may pivot about the dolly wheel axles mounted to the ends of each base bar 20. During the assembly, the vehicle to be towed need not be moved; a tubular member 40 is placed on the ground on each side of the two tires on one axle and the dolly wheel assemblies 12, 14 are coupled to the members 40. The result is shown in FIG. 2.

Linear force, such as by the hydraulic ram, is applied to force outward the top of the upper arms 30 of the crank arms 26 to thereby force the lower main arms 28 together with the tubular members 40 inward and upward to lift the vehicle. The positioning rods 52 engage the end notches in the stop plates 54 and the sleeves 50 around the tubular members 40 are rotated to raise the wheel locking plates 48 against the vehicle tires. The hook 60 is then secured around the housing on the deadbolt 38 and one end of the vehicle is lifted and ready for towing

I claim:

1. A lifting dolly for vehicle towing, said dolly comprising:
    a pair of spaced parallel members, each member in said pair being positionable on the ground and adjacent the periphery of tires on a vehicle axle;
    a pair of substantially identical dolly wheel assemblies, at least one of said assemblies including:
    a substantially horizontal base member positioned perpendicular to the longitudinal axes of said parallel members;
    a crank member located at each end of said base member and having an upper extending arm joined to a downward depending arm;
    pivoting means connecting each end of said base member with said crank member at a point near the joining of said arms, said pivoting means enabling said crank member to rotate about an axis parallel with the longitudinal axes of said spaced parallel members, said pivoting means also being an axle for a dolly wheel;
    socket means attached to the end of each of said downward depending arms for receiving an end of one of said pair of spaced parallel members; and
    linearly extendible means coupled between the ends of the upper extending arms of said crank members, the extension of said extendible means causing the depending arms of said crank members to pivot inward and to raise said pair of spaced parallel members.

2. The dolly claimed in claim 1 wherein said each of said spaced parallel members are identical and each has at each end a coaxial wide-headed stud extending from said member and a plate normal to the axis of the member, said plate having a clearance hole for a deadbolt for removably securing the end of said member to said socket means.

3. The dolly claimed in claim 2 wherein said socket means on the ends of said downward depending crank arms includes an open slot for slideably receiving said wide headed stud and a deadbolt positioned for engaging said clearance hole.

4. The dolly claimed in claim 3 further including an over-center locking mechanism attached to said horizontal base member, said locking mechanism having a depending hook element for engaging a portion of said deadbolt.

5. The dolly claimed in claim 4 wherein the engagement of said hook element on said portion of said deadbolt locks said deadbolt against being opened.

6. The dolly claimed in claim 1 wherein said linearly extendible means is a hydraulic piston assembly.

7. The dolly claimed in claim 1 further including a wheel locking plate mounted on at least one end of each of said pair of spaced parallel members, said wheel locking plate being rotatable about the axis of said members by the action of a positioning rod coupled to said locking plate with a stationary stop plate secured to said horizontal base member, said rotation being limited between a downward slanting wheel ramp position and an upward slanting wheel locking position.

8. A hydraulic lift dolly for vehicle towing, said dolly comprising:
    a pair of substantially identical wheel assemblies each having two wheels aligned in tandem and on outward extending axles;
    a pair of crank members having first and second ends, each of said members being pivotally coupled near its center to a shaft coaxial with a wheel axle for pivotal motion of said crank member parallel with said wheels;
    at least one of said identical wheel assemblies having a hydraulic piston coupled between the first ends of said pair of crank members for pivoting said crank members; and
    a pair of substantially parallel, spaced, identical vehicle supporting members having first and second ends, the first ends of said pair of supporting members being removably coupled to the second ends of said pair of crank members on one pair of said wheel assemblies, the second ends of said pair of supporting members being removably coupled to the second ends of said pair of crank members on the other one of said wheel assemblies, said supporting members being parallel with the wheel axles on said wheel assemblies.

* * * * *